Patented Apr. 17, 1934

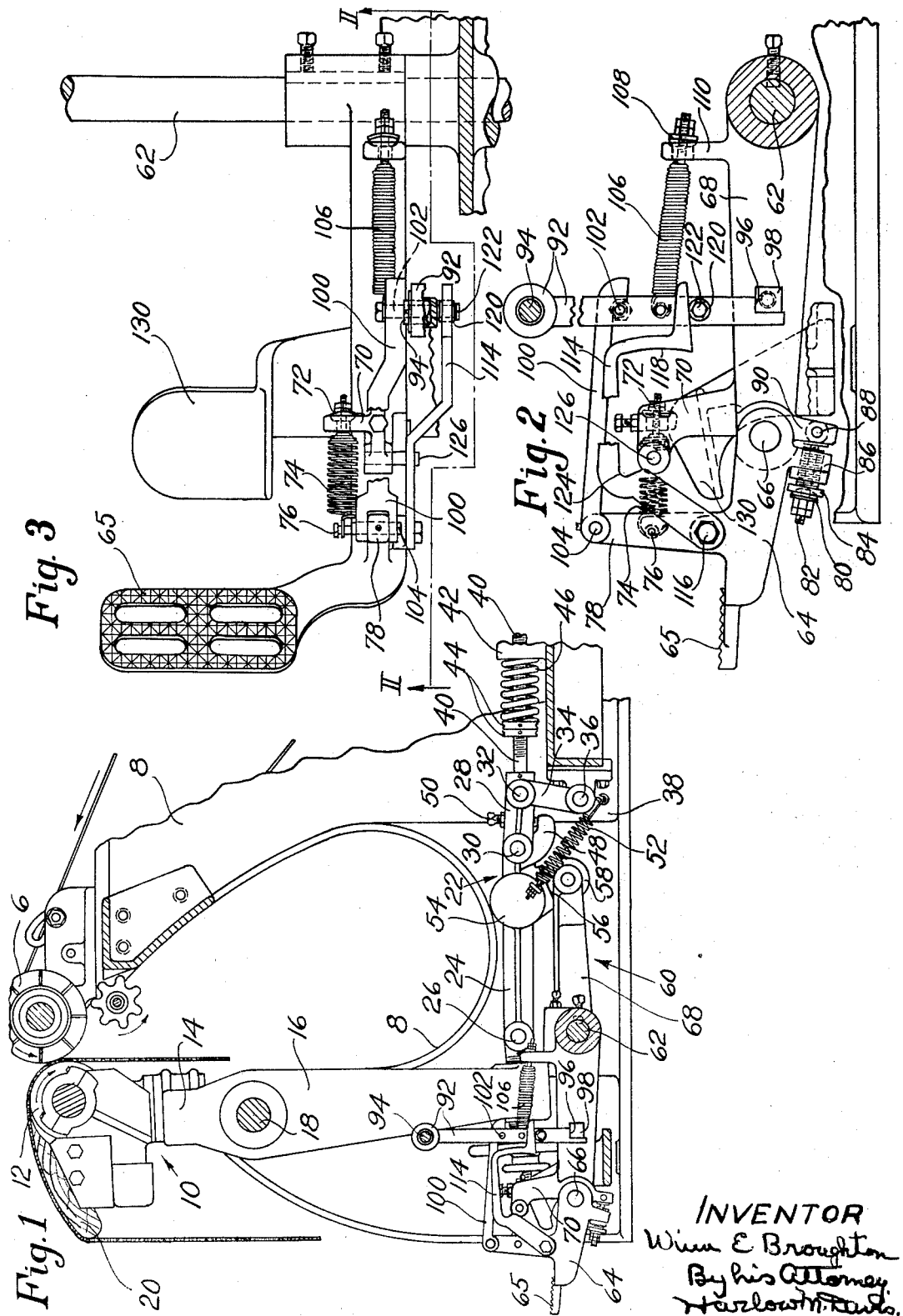

1,955,051

UNITED STATES PATENT OFFICE 1,955,051

MACHINE FOR OPERATING UPON HIDES, SKINS, LEATHER AND OTHER SIMILAR PIECES OF WORK

Winn E. Broughton, Peabody, Mass., assignor to The Turner Tanning Machinery Company, Portland, Maine, a corporation of Maine Application August 4, 1931, Serial No. 555,053

22 Claims. (Cl. 149—16)

This invention relates to machines for operating upon hides, skins, leather and other similar pieces of work. While the invention is illustrated as embodied in a machine designed for shaving operations on pieces of leather it is to be understood that the invention and various important features thereof may have various applications and uses.

As heretofore constructed shaving machines have commonly been machines of the type wherein the operator retains control of the work and of the depth of the shaving cut throughout shaving operations by means of a treadle with respect to which the operator is required to exert continuous but variable pressure so that the work support may present the work to the operating tool with a pressure which is varied in accordance with the judgment of the operator. More recently shaving machines, particularly those of larger size, have comprised power means under the control of the operator for moving the work support to cause presentation of the work to the operating tool and for holding the work support substantially in predetermined relation to the operating tool, a yielding means in the work support being depended upon to permit a certain amount of self-accommodation of the work support with respect to the operating tool as the work varies in thickness. In this latter case the operator cannot vary the pressure, during the operation of the machine, to suit his idea of the requirements of a given piece of work. While machines of the last-mentioned type ordinarily comprise means for adjusting the work support relatively to the operating tool, this always requires time and a certain amount of effort which is ordinarily avoided by the operator, if possible, unless the work coming to the machine differs quite substantially from that for which the machine has been adjusted. While the operator with this second type of machine cannot control the shaving operations on a given piece of work, since the work support is practically locked in predetermined relation to the tool, there is a distinct advantage in that he is relieved of a great deal of labor since he is not required to exert the force necessary to keep the work support up to the work treating tool as in the first type of shaving machine mentioned above.

It is an object of this invention to provide an improved machine for treating pieces of work wherein the operator may condition the machine practically instantaneously so that he may constantly exercise control of the work and of the machine throughout operations on given pieces of work, or alternatively, operate the machine with the work support locked in predetermined relation to the operating tool whereby treatment of the work is predetermined through adjustment of the machine and judicious selection of the work to be treated.

To these ends, and in accordance with an important feature of the invention, there is provided, in a machine having means for locking a work support in work presenting position with respect to a tool, improved means for enabling the operator instantaneously to condition the machine so that he may maintain constant control of the work support while in its work presenting position with respect to the operating tool or, alternatively, operate the machine to cause locking of the work support in predetermined work presenting position with respect to the operating tool during a length of time determined by the operator. Conveniently the improved means referred to comprises a latching member, carried by a treadle member employed to cause movement of the work support between work receiving and work presenting positions, and operable to render the locking means inoperative. In the illustrated construction, the treadle member comprises a tread part and a second part pivoted to the tread part and arranged to co-operate with the locking means in locking the work support in work presenting position with respect to the work treating tool, and the latching member is operative not only to render said locking means inoperative but to convert the two-part treadle member into a single rigid treadle for exercising continuous control of the work support while the latter is unlocked and in work presenting position with respect to the work treating tool.

From another viewpoint, the invention resides in the provision of means, in an organization comprising a work support for presenting pieces of work to a work treating tool, for locking the work support in its work presenting position with respect to the tool under control of a manually operable member effective to cause movement of the work support between work receiving and work presenting position with respect to said tool. This arrangement is advantageous in that a single manually operable member utilized to cause movement of the work support between work receiving and work presenting positions with respect to the operating tool is also employed in rendering the locking means alternately inoperative and operative in timed relation to the movements of said manually operable member. In the illustrated machine the manually operable member is the two-part treadle member referred to, one part of which co-operates with the locking means in locking the work support in work presenting position with respect to the work treating tool, while the other part of the treadle member controls the locking means. In this way there is provided a simple and compact treadle mechanism which is easy to operate in marked contrast to certain prior constructions wherein the operator has to manipulate two or more lever members to move a work support and to control a work support locking means.

These and other features of the invention and novel combinations of parts will now be described in detail and then pointed out more particularly in the appended claims.

In the drawing,

Fig. 1 is a side elevation and partly in section of a shaving machine illustrating one embodiment of the invention;

Fig. 2 is a view taken along the line II—II of Fig. 3 looking in the direction of the arrows; and Fig. 3 is a plan view of the structure shown in Fig. 2.

In the illustrated machine, which is designed more particularly for shaving operations upon hides and skins, there is provided a work treating tool in the form of a bladed cylinder 6 mounted at its ends in a machine frame 8. For presenting a piece of work to the cylinder 6 there is provided a work support 10 comprising a bed roll 12 pivotally mounted for rotation in the upper ends of a pair of arms one of which is shown at 14 in Fig. 1. These arms 14 constitute part of a bed roll supporting frame 16 pivoted at 18 in the machine frame 8. Mounted fixedly upon the arms 14 is a work supporting table 20 over which the work is shoved by hand until it is properly engaged with the bed roll 12. While the bed roll 12 may be an idler roll it is preferably power driven in the direction of the arrow in Fig. 1 by means not shown.

In Fig. 1 of the drawing the work support comprising the bed roll 12 is shown in work presenting relation with respect to the bladed cylinder 6, the work support being moved to and maintained yieldingly in this position in the illustrated construction by means comprising a toggle mechanism indicated in general by reference character 22. One link 24 of the toggle mechanism is pivoted at 26 to the lower end of the bed roll supporting frame 16 while the other link 28 is pivoted at 30 to the rear end of the front link 24. Pivoted at 32 to the toggle link 28 is a vertically arranged link 34 which is pivoted at its lower end by pivot 36 upon a member 38 rigid with the machine frame 8. Also pivoted at 32 to the toggle link 28 is a rod 40 which passes loosely through a stationary abutment 42. Preferably, and as shown, the rod 40 is screw threaded and carries a pair of interiorly threaded disks 44 which together form one abutment for a spring 46, the other end of which rests against the abutment 42. It will be understood that the spring 46 surrounds the rod 40 and is adjustable, as to tension, through proper manipulation of the disks 44 on the rod 40. Carried by the rear end of the toggle link 24 is a downwardly curved arm 48 with which there contacts the lower end of a set screw 50 mounted in link 28, the purpose of the set screw 50 and arm 48 being to limit movement of the toggle links 24, 28 in the direction of straightening the toggle. It is clear, for instance, that through proper setting of the set screw 50 the center 30 of the toggle may be allowed to pass slightly beyond the center line passing through the centers of the pivot members at 26 and 32. On the other hand, the set screw 50 may be so adjusted as to stop the upward movement of the toggle links 24, 28 at dead center in which case the toggle is easily broken in a downward direction by suitable means such as a spring 52 secured to a portion of toggle link 24 and to a hook secured to the lower end of link 34. To assist in breaking the toggle 22, link 24 thereof is provided with a weighted portion 54. Conveniently also this weighted portion of the link 24 is provided with a contact surface at 56 against which a roll 58 in a treadle lever 60 operates in lifting the link 24 to straighten the toggle 22.

The treadle lever 60 not only operates the toggle 22, to cause movement of the work support 10 between work receiving and work presenting positions, but controls means for locking the work support in work presenting position with respect to the tool 6. The treadle lever 60, which is secured to a shaft 62 mounted rotatably in the frame 8 of the machine, is made up of two parts, namely, a tread part 64 having a tread portion 65 and pivoted at 66 to the front end of a toggle operating part 68. Extending upwardly from the treadle part 68 is a post 70 which furnishes a socket for a spring attaching member 72 (Fig. 3). To the spring attaching member 72 is attached a spring 74 which, at its front end, is connected to a pin 76 carried by an upstanding arm 78 of the tread part 64. To limit movement of the tread part 64 under the action of the spring 74 there is provided a stop member 80 (Fig. 2) adjustably carried by a rod 82 which passes loosely through a sleeve 84 screw threaded into a projection 86 extending downwardly from the tread part 64. One end of the rod 82 is pivoted as at 88 in an arm 90 extending downwardly from the treadle part 68. Through adjustment of the sleeve 84 in the projection 86 and of the stop 80 on the rod 82, the angular relationship of the tread part 64 to the treadle part 68 may be varied as desired. Upon depression of the tread part 64, by pressure of the foot upon the tread 65, the projection 86 of the tread part 64 slides along the rod 82 until the adjacent faces of the projection 86 and of the arm 90 contact with each other, whereupon the treadle parts 64 and 68 move downwardly together as one treadle lever 60. Upon releasing the tread part 64 the spring 74 immediately restores the parts to the position shown in Fig. 2.

The described movement of the tread part 64 is for the purpose of controlling a locking means for the work support 10, said locking means comprising, in the illustrated construction, a link member 92 pivoted at 94 on the frame of the machine, said locking member 92 having a notched portion at its lower end which forms a locking shoulder 96 for engagement with a block 98 secured to one side of the lever member 68. It is clear that the front end of the lever member 68 is shown in Figs. 1 and 2 in its lower locked position in which it is holding the toggle 22 in straightened condition with result that the work support 10 is maintained in work presenting position with respect to the work treating tool 6. In order to move the locking member 92 to inoperative position a connecting link 100 is provided for engagement with a pin 102 extending laterally from one side of the locking member 92, the other end of the link 100 being pivotally attached at 104 to the upper end of the upstanding arm 78 on the tread part 64, the arrangement being such that, upon depression of the tread part 64, the locking member 92 will be moved to the left in Figs. 1 and 2 about its pivotal support 94 to such an extent as to remove its shoulder 96 to a position at one side of the block 98 on the treadle member 68. Upon removal of the locking member 92 to the left in Figs. 1 and 2, the front end of the treadle member 68 is released and permitted to rise, this movement of treadle member 68 being accompanied by breaking of the toggle 22 and movement of the work support 10 to work receiving position. For returning the locking member 92 to its operative position there is provided a spring 106 secured at one end to the locking member 92 and at its other end to a spring attaching member 108 movable in a socket within an extension 110 on the treadle member 68. With the parts arranged as shown in Figs. 1 and 2, the shaving machine is conditioned for operation as a machine of the type wherein the operator does not maintain control of shaving operations on a given piece of work. In other words, the work support 10 is locked in its work presenting position and whatever yielding takes place is provided for by the spring 46 (Fig. 1). At the termination of the operation on a given piece of work, the operator depresses the tread part 64, thus moving the locking member 92 to inoperative position whereupon the treadle lever 60 will move to toggle releasing position during which the upper end of the work support 10 swings to the left to permit the removal of the piece of work undergoing treatment and introduction of a fresh piece of work. The described depression of tread part 64 takes place before any substantial depression of the adjacent end of treadle member 68 so that the latter is freed from the locking member 92 by depression of said tread part 64. With the piece of work in place the operator again depresses the tread part 64, this time with such force and through such a distance as to carry the treadle member 68 down to a position where the block 98 on the treadle member comes below the shoulder 96 on the locking member 92. Upon release of pressure on the tread 65 of the tread part 64, the locking member 92 is at once snapped into place above block 98 by the spring 106 before the slower moving parts, comprising treadle part 68, can lift block 98 above the level of shoulder 96 on locking member 92. Hence the treadle is held in locked position.

When it is desired to condition the machine in such a way that the operator retains control of shaving operations on a given piece of work, the locking member 92 is held in inoperative position by means of a latching member 114 (Fig. 2) which is pivotally mounted at 116 on the tread part 64. This latching member 114 is manually positioned to hold the locking member 92 in inoperative position. Said latching member 114 has a curved cam surface at 118 adapted to engage a roll 120 on a stud 122 extending laterally from one side of the locking member 92. This cam surface operates to hold the latching member 114 in its latching position with respect to the locking member 92.

The latching member 114 conveniently serves another function since it may be utilized in locking the tread portion 64 in fixed relation with respect to the treadle member 68. For this purpose the latching member 114 has a notch at 124 engageable with a pin 126 extending laterally from the post 70. In order to position the latching member 114 in operative position, the locking member 92 is pulled by hand or otherwise to the left in Fig. 2 until the roll 120 on the pin 122 is engaged with the cam surface 118, whereby the locking member 92 is held in inoperative position relative to the block 98 on the treadle member 68. If now the treadle part 64 be depressed by stepping on the tread 65, the latch 114 will drop to a position where the pin 126 becomes engaged with the notch 124, the dropping of the latch 114 being aided by the cam surface 118 which acts to force the latch downwardly upon pressure being applied to the tread 65. It follows that thereafter the tread part 64 is locked in a fixed relation to the treadle member 68 so that the two parts 64 and 68 constituting the treadle lever 60 operate as a single member. With the machine thus conditioned the operator must depress the free end of the treadle lever 60 by stepping on the tread 65 in order to move the work support 10 into work presenting position with respect to the bladed tool 6. Moreover, he must maintain pressure upon the tread 65 in order to hold the work support with the work pressed against the bladed tool. This, of course, adds considerably to the labor involved in operating the machine but it has the advantage of enabling the operator to vary the pressure on the work instantly and as required to suit the conditions with respect to each piece of work. A toe rest 130 is provided to aid the operator in maintaining the tread part 64 depressed and in varying the pressure on said tread part to change as desired the pressure at which shaving operations are being performed.

With the machine conditioned to permit operation of the locking member 92, as shown in Figs. 1 and 2 of the drawing, it is clear that, when the treadle is depressed after the introduction of a piece of work over the work support 10, the said work support will be locked in its work presenting position with respect to the tool 6. Any yielding of the work support 10 with respect to the tool 6 to accommodate variations in the thickness of the work is permitted by the spring 46 at the right end of the toggle mechanism in Fig. 1 of the drawing. For certain classes of work and for many pieces of work in various classes this is an advantageous arrangement since it reduces markedly both strain and effort on the part of the operator. Furthermore it tends to secure a quite desirably uniformity in shaving operations upon a given or selected batch of work. If even a moderate amount of attention be paid to the selection of the work and to the adjustment of the machine it is possible to obtain excellent results with the machine so conditioned that the work support is locked in work presenting position with respect to the tool. On the other hand, certain classes of work and, in some cases, individual pieces of work of different classes, may be such as to require control by the operator of the shaving operations throughout the operation of the machine. In this latter case the treadle lever 60 is conditioned to operate as a single lever member which must be constantly under the control of the operator, as above described.

Having described my invention, what I claim as new and desire to secure by Letters Patent of the United States is:

1. In a machine for operating upon pieces of work, a work treating tool and a work support relatively movable to effect presentation of pieces of work to said tool, means to cause such relative movement of the work support and the tool, said means comprising a manually operable member through which the operator exerts the force necessary to cause said relative movement, a member arranged to maintain the work support and the tool in their work operating position, and a connection between the manually operable member and the last-mentioned member to move the latter to inoperative position, whereby said manually operable member is operative to cause said relative movement of the tool and work support and also render the last-recited member inoperative.

2. In a machine for operating upon pieces of work, a work treating tool, a work support arranged to present pieces of work to said tool, means to move the work support into work presenting position with respect to the tool, said means comprising a tread member through which the operator exerts the force necessary to move the work support, a member arranged to lock the work support in its work presenting position, and a connection between the tread member and the locking member to operate the latter to releasing position, whereby the said tread member is operative to move the work support to operative position and to cause release of the locking means.

3. In a machine for operating upon pieces of work, a work treating tool, a work support arranged to present pieces of work to said tool, means to move the work support into work presenting position with respect to the tool, said means comprising a treadle member arranged to be depressed by the foot of the operator to move the work support, and means to lock the work support in work presenting position with respect to said tool comprising a latch member pivoted on the machine frame, said treadle member having a connection with the latch member arranged to render the latch member inoperative directly through the force applied in the depression of said treadle member.

4. In a machine for operating upon pieces of work, a work treating tool, a work support arranged to present pieces of work to said tool, means to move the work support into work presenting position with respect to the tool, said means comprising a treadle operably connected to the work support and operative when depressed to hold the work support in work presenting position with respect to said tool, means arranged to lock the treadle in depressed position and the work support in said work presenting position, and means controlled by the treadle to move the locking means to inoperative position with respect to said treadle whereby the latter may be released from the locking means upon proper manipulation of said treadle.

5. In a machine for operating upon pieces of work, a work treating tool and a work support, one of these two members being movable with respect to the other to effect presentation of pieces of work to said tool, means to move the movable member into such position that the tool may operate on the work, said means comprising a treadle member, means to maintain the work support and the tool in their operating position with respect to the work, and a direct link connection between the treadle member and said maintaining means arranged to move the latter positively to inoperative position upon depression of said treadle member.

6. In a machine for operating upon pieces of work, a work treating tool, a work support arranged to present pieces of work to said tool, means to move the work support into work presenting position with respect to the tool, said means comprising a manually operable member, and means to lock the work support in work presenting position with respect to the tool, said manually operable member having means arranged to control the locking and unlocking movements of said locking means in timed relation to the movements of said manually operable member.

7. In a machine for operating upon pieces of work, a work treating tool, a work support arranged to present pieces of work to said tool, means to move the work support into work presenting position with respect to the tool, said means comprising a two-part lever member one part of which is operably connected to the work support, and means to lock the work support in work presenting position with respect to said tool, said two-part lever member comprising also a manually operable part movable with respect to the first-mentioned lever part and arranged to operate the latter part to move the work support, and a pivotal connection between the manually operable lever part and the locking means to control the latter from the former.

8. In a machine for operating upon pieces of work, a work treating tool, a work support arranged to present pieces of work to said tool, means to move the work support into work presenting position with respect to the tool, said means comprising a two-part treadle member operably connected to the work support, and a locking member for co-operation with one of said treadle member parts in locking the work support in work presenting position with respect to said tool, said two-part treadle member comprising a tread part movable with respect to the first-mentioned treadle part and having a connection arranged to control the locking member.

9. In a machine for operating upon pieces of work, a work treating tool, a work support arranged to present pieces of work to said tool, means to move the work support into work presenting position with respect to the tool, said means comprising a treadle member comprising two parts pivotally connected end to end and of which one is a tread part, means to lock the work support in work presenting position with respect to said tool, and a connection between the locking means and said tread part of the treadle member whereby the latter controls the locking means.

10. In a machine for operating upon pieces of work, a work treating tool, a work support arranged to present pieces of work to said tool, means to move the work support into work presenting position with respect to the tool, said means comprising a treadle member operably connected to the work support, means arranged to lock the work support in work presenting position with respect to said tool, and means carried by the treadle member for rendering the locking means inoperative, said means once it becomes operative serving to maintain the locking means inoperative during repeated operations of the treadle member, whereby the work support must be held in work presenting position, with respect to said tool during treatment of a given piece of work, by force exerted by the operator continuously during such treatment.

11. In a machine for operating upon pieces of work, a work treating tool, a work support arranged to present pieces of work to said tool, means to move the work support into work presenting position with respect to the tool, said means comprising a treadle member operably connected to the work support and operative when depressed to hold the work in work presenting position with respect to said tool, means arranged to lock the treadle in depressed position and the work support in said work presenting position, means controlled by the treadle to move the locking means to inoperative position with respect to said treadle member whereby the latter may be released from the locking means upon proper manipulation of said treadle member, and means carried by said treadle member for latching the locking means in inoperative position, whereby the work support may be held continuously in work presenting position with respect to said tool during treatment of a given piece of work.

12. In a machine for operating upon pieces of work, a work treating tool, a work support arranged to present pieces of work to said tool, means to move the work support into work presenting position with respect to the tool, said means comprising a two-part treadle member operably connected to the work support to operate the latter, said treadle member comprising a tread part and a work-support operating part pivotally connected to the tread part, a locking member for the treadle member, and a member for holding the locking member in inoperative position and the two parts of the treadle member rigid with respect to each other.

13. In a machine for operating upon pieces of work, a work treating tool, a work support arranged to present pieces of work to said tool, means to move the work support into work presenting position with respect to the tool, said means comprising a treadle member comprising two movably connected parts of which one is a tread part and the other a part operably connected to the work support, means to lock the second-mentioned treadle part in a predetermined position, whereby the work support is locked in work presenting position with respect to said tool, a connection between the locking means and said tread part of the treadle member whereby the latter controls the locking means, and a member connected to the tread part of the treadle member for controlling the position of the tread part with respect to the other part of the treadle member.

14. In a machine for operating upon pieces of work, a work treating tool, a work support arranged to present pieces of work to said tool, means to move the work support into work presenting position with respect to the tool, said means comprising a treadle member consisting of two movably connected parts of which one is a tread part and the other a part operably connected to the work support, means to lock the second-mentioned treadle part in a predetermined position, whereby the work support is locked in work presenting position with respect to said tool, a connection between the locking means and said tread part of the treadle member whereby the latter controls the locking means, and a member connected to the tread part of the treadle member for making the tread part rigid with respect to said other part of the treadle member.

15. In a machine for operating upon pieces of work, a work treating tool, a work support arranged to present pieces of work to said tool, means to move the work support into work presenting position with respect to the tool, said means comprising a treadle member consisting of two movably connected parts of which one is a tread part, means to lock the work support in work presenting position with respect to said tool, a connection between the locking means and said tread part of the treadle member whereby the latter controls the locking means, and a member connected to said tread part of the treadle member for holding said locking means in inoperative position and said tread part in fixed, unyielding relation to the other part of the treadle member.

16. In a machine for operating upon pieces of work, a work treating tool, a work support arranged to present pieces of work to said tool, means to move the work support into work presenting position with respect to the tool, said means comprising a treadle member consisting of two pivotally connected parts of which one is a tread part, means to lock the work support in work presenting position with respect to said tool, a connection between the locking means and said tread part of the treadle member whereby the latter controls the locking means, and a member connected to said tread part of the treadle member for holding said locking means in inoperative position and said tread part in fixed, unyielding relation to said other part of the treadle member.

17. In a machine for operating upon pieces of work, a work treating tool, a work support arranged to present pieces of work to said tool, means to move the work support into work presenting position with respect to the tool, said means comprising a two-part treadle member having a tread part and another part pivotally connected thereto, means arranged yieldingly to hold the tread part in a predetermined relation to said other part, a pivoted locking member for co-operation with said other part of the treadle to lock the work support in work presenting position with respect to said tool, and a connection between the tread part of the treadle member and the pivoted locking member whereby, upon depression of the tread part of the treadle member, the locking member is swung to unlocking position.

18. In a machine for operating upon pieces of work, a work treating tool, a work support arranged to present pieces of work to said tool, means to move the work support into work presenting position with respect to the tool, said means comprising a two-part treadle member having a tread part and another part pivotally connected thereto, means arranged yieldingly to hold the tread part in a predetermined relation to said other part, a locking member for co-operation with said other part of the treadle to lock the work support in work presenting position with respect to said tool, a connection between the tread part of the treadle member and the locking member whereby upon depression of the tread part of the treadle member the locking member is moved to unlocking position, and a member connected to the tread part for locking it in fixed position with respect to said other part of the treadle member.

19. In a machine for operating upon pieces of work, a work treating tool, a work support arranged to present pieces of work to said tool, means to move the work support into work presenting position with respect to the tool, said means comprising a two-part treadle member having a tread part and another part pivotally connected thereto, means arranged yieldingly to hold the tread part in a predetermined relation to said other part, a locking member for co-operation with said other part of the treadle for locking the work support in work presenting position with respect to said tool, a connection between the tread part of the treadle member and the locking member whereby upon depression of the tread part of the treadle member the locking member is moved to unlocking position, and a member connected to the tread part of the treadle member for holding the locking member in inoperative position and for holding the tread part in fixed relation to said other part of the treadle member.

20. In a machine for operating upon pieces of work, a work treating tool, a work support arranged to present pieces of work to said tool, means to move the work support into work presenting position with respect to the tool, said means comprising a toggle, a two-part treadle member arranged to operate the toggle, said two-part treadle member comprising a tread part and a toggle-operating part, and means controlled by the tread part to lock the toggle-operating part of the treadle member with the toggle in completely extended condition.

21. In a machine for operating upon pieces of work, a work treating tool, a work support arranged to present pieces of work to said tool, means to move the work support into work presenting position with respect to the tool, said means comprising a toggle, a two-part treadle member arranged to operate the toggle, said two-part treadle member comprising a tread part and a toggle-operating part, and means controlled by said tread part to lock the work support in work presenting position with respect to said tool.

22. In a machine for operating upon hides, skins, and leather, a rotary work treating tool, a work support pivoted on a horizontal axis and arranged to present pieces of work to said tool, means to move the work support into work presenting position with respect to the tool, said means comprising a toggle connected to the lower end of the work support, a two-part treadle member connected to the toggle to operate the latter to cause movement of the work support between work receiving and work presenting position with respect to said tool, said two-part treadle member comprising a tread part and a toggle-operating part, and means controlled by said tread part to lock the toggle-operating part with the work support in work presenting position with respect to said tool, said tread part of the treadle member being pivotally connected to the toggle operating part of said treadle and having means for connecting it rigidly to said toggle-operating part of the treadle member.

WINN E. BROUGHTON.